(12) United States Patent
Ko (10) Patent No.: US 10,554,400 B2
(45) Date of Patent: Feb. 4, 2020

(54) METHOD AND A SYSTEM FOR GENERATING A MULTI-FACTOR AUTHENTICATION CODE

(71) Applicant: Cheng-Han Ko, New Taipei (TW)

(72) Inventor: Cheng-Han Ko, New Taipei (TW)

(*) Notice: Subject to any disclaimer, the term of this patent is extended or adjusted under 35 U.S.C. 154(b) by 245 days.

(21) Appl. No.: 15/824,154

(22) Filed: Nov. 28, 2017

(65) Prior Publication Data

US 2018/0159686 A1 Jun. 7, 2018

(30) Foreign Application Priority Data

Dec. 2, 2016 (TW) .............................. 105139985 A (51) Int. Cl.

| | |
|---|---|
| *H04L 9/32* | (2006.01) |
| *H04L 9/08* | (2006.01) |
| *G06F 3/041* | (2006.01) |
| *H04L 29/08* | (2006.01) |
| *H04L 29/06* | (2006.01) |

(52) U.S. Cl.
CPC .......... *H04L 9/0869* (2013.01); *G06F 3/0412* (2013.01); *H04L 63/08* (2013.01); *H04L 67/18* (2013.01)

(58) Field of Classification Search
USPC ......................................................... 713/171
See application file for complete search history.

(56) References Cited

U.S. PATENT DOCUMENTS

| | | | | |
|---|---|---|---|---|
| 7,260,719 | B1* | 8/2007 | Asano ................... | G06F 21/445 348/E7.056 |
| 7,526,646 | B2* | 4/2009 | Fukuda ............... | H04L 63/0807 713/168 |
| 8,156,546 | B2* | 4/2012 | Varadarajan, Sr. ..... | G06F 21/41 726/3 |
| 8,321,674 | B2* | 11/2012 | Hamada ................ | H04L 9/32 380/262 |
| 8,341,397 | B2* | 12/2012 | Leedom, Jr. .......... | H04L 63/068 713/156 |
| 8,364,961 | B2* | 1/2013 | Tanaka ................. | H04L 9/32 713/168 |
| 2006/0050877 | A1* | 3/2006 | Nakamura ............ | G06F 21/445 380/46 |

* cited by examiner

*Primary Examiner* — Amare F Tabor
(74) *Attorney, Agent, or Firm* — Muncy, Geissler, Olds & Lowe, P.C.

(57) ABSTRACT

The present invention provides a method and a system for generating a multi-factor authentication code. The method comprises steps of generating a plurality of random numbers that are completely random; arranging the plurality of random numbers into a combination in a time-series or a random way; dividing the combination into a plurality of sub-combinations; transmitting each of the plurality of sub-combinations to one of corresponding plurality of interfaces respectively via one path according to a distributing rule; combining the plurality of sub-combinations received by the plurality of interfaces to form the multi-factor authentication code according to a combining rule. And the system comprises a processor being programmed to function as: a random number generator, an arranging unit, a dividing unit, a transmitting unit, and a combining unit.

10 Claims, 6 Drawing Sheets

METHOD AND A SYSTEM FOR GENERATING A MULTI-FACTOR AUTHENTICATION CODE

FIELD OF THE INVENTION

The present invention is related to a method and a system for generating a multi-factor authentication code, more particularly to one which allows users to log in, watch and listen the interfaces via any devices with more confidentiality, authenticity controllability, availability, integrity and non-repudiation. Moreover, the multi-factor authentication code is generated in a completely random way and the rule for assigning each sub-combinations to the different interfaces located in the plurality of devices is also completely random and can be set by different users.

BACKGROUND OF THE INVENTION

For the governmental, banking, national defense, enterprise, organizational and medical institutions, the information flow therein is usually transmitted via a specific interface such as e-mail, instant messaging software (ex: Skype), voice communication devices . . . etc, and those specific interface are user-specific so that those specific interfaces are logged in with a specific account and password, thereby confidential information is transmitted via the same. Most of the information mentioned above is usually classified into the top secret, secret, confidential or unclassified according to its importance. Thus, such information has a determinant and risky influence for governmental, banking, national defense, enterprise, organizational and medical institution, and the information described above is not usually available to be public, so it needs to be encrypted and certificated to maintain the fairness and justice of social responsibility.

Moreover, the result of development of social information technology is the growth of many community websites such as Facebook and Weibo, and this development significantly reduces limitations of space and time for the whole world. For this reason, personal privacy should be controlled or managed securely, especially for some information regarding person or specific organization in such community websites, their specific account and password are not available to be disclosed to a third-party and need to conform the stringent global personal data protection law, so as to meet the need of personal privacy protection. Therefore, the above information is required to be safely controlled and managed, so as to prevent users from reading, downloading or modifying intentionally or unintentionally, and prevent those who steal information such as hackers, commercial espionage, military espionage and internal staff from arbitrarily capturing, decrypting or invading the packets and communication of information system, and then stealing the secret files or documents such as patent technology, national defense secrets, trade secrets, personal information, banking information, which would result in irreversible consequences that seriously affect the social, economic, and national security.

Although many systems of enterprises, many community website, community software, e-mail and instant messaging systems, such as Google, Yahoo, Line, Facebook and WeChat all have two-factor authentication system at present time, that is, the certification is completed by sending a log-in authentication code to the phone through SMS. When a user logs in e-mail system, the server of the e-mail system transmits a log-in authentication code to the cell phone of the user after the user inputs his account name and password during the log-in process, and then in addition to account name and password, the user must enter the received authentication code so as to log in successfully. However, scam gang is rampant at the present time. Scammers use a variety of tricks to deceive users, especially for elder persons to provide their authentication code, which leads to the invasion of their accounts for their instant messaging system, social network website or e-mail system. Moreover, the worse is that the account name or credit card information of high-level executive of the enterprises is stolen, which would result in that so many innocent people suffer financial losses. Therefore, considering the evil nature of human being, the existing two-factor authentication systems still obviously would have great defect and are not perfect. On the other hand, for the existing Remote Keyless Entry system, it becomes more and more developed. However, a unique password for starting a vehicle is easily stolen by using specific software. Accordingly, there is a need to improve the security of the existing Remote Keyless Entry system.

Virtual reality (VR) refers to computer technologies that use software to generate three-dimensional images, realistic sounds and other sensations that replicate a real environment, so that users are immersive and can observe objects or events in the three-dimensional image instantly. When the user moves, the software can perform complicated operations immediately, and sends accurate 3D image to the user so as produce telepresence, which is usually obtained by special display devices or stereoscopic display devices such as medium and large computer screens. In addition, some simulations produced by the same also include other senses of the human facial features such as sound effects from audio equipment and headphones. This technology integrates computer graphics, artificial intelligence, motion sensing, display and network parallel processing technology, which is a computer-assisted technology to generate high-technology simulation system. Thus, virtual reality technology is clearly the mainstream of the next 20 years. However, there is no technology that combine virtual reality technology with two factor authentication at present time, the virtual reality technology now at most is used in computer games and in transport driving of variety of military or folk.

Augmented Reality (AR) is a technology for computing the position and angle of an image in a camera device or an interface in real time, and then the corresponding image, object or animation is added. The purpose of this technology is to combine the virtual world with the real world on the display and allow both to interact with each other. In other words, a virtual object is added in the real world by the identification technology of camera device and operations of computer so as to substantially extend the space sense regarding interaction between objects and devices. However, there is no device or system that combines augmented reality technology with two factor authentication at present time.

Therefore, in order to overcome the technical problems mentioned above, the present invention is developed.

SUMMARY OF THE INVENTION

In order to solve the problem mentioned above, the present invention provides a method for generating a multi-factor authentication code, comprising steps of A: generating a plurality of random numbers;

B: arranging the plurality of random numbers into a combination in a time-series or a random way;

C: dividing the combination into a plurality of sub-combinations;
D: transmitting each of the plurality of sub-combinations to one of corresponding plurality of interfaces via one path according to a distributing rule; and
E: combining the plurality of sub-combinations received by the plurality of interfaces to form a multi-factor authentication code according to a combining rule.

In implementation, in the above method, the distributing rule is corresponding each of the plurality of sub-combinations to one of plurality of interfaces.

In implementation, in the above method, the step D further comprises steps of:
D1: detecting a geographical location of a user and comparing the geographical location with a preset geographical range, where if the geographical location is inside the preset geographic range, each of the generated plurality of sub-combinations is transmitted to one of corresponding plurality of interfaces through one path according to the distributing rule;
if the geographical location is outside the preset geographic range, at least one predetermined invalid-sub-combination is transmitted to one of the corresponding plurality of interfaces according to the distributing rule through a path;
wherein the step of E further comprises:
E1: combining the sub-combinations or the at least one invalid-sub-combination received by the plurality of interfaces with other sub-combinations according to the combining rule so as to form the multi-factor authentication code or an invalid number code.

In implementation, the interface comprises at least one of a visual interface, an auditory interface and a login interface.

In implementation, further comprising a step X before the step A: determining the number of the random numbers generated in the step A and bit number of each random number generated in the step A, wherein each of the random numbers has the same or different bit number.

In implementation, in the above method, further comprising a step A1 between the step A and the step B: verifying the plurality of random numbers.

In implementation, in the above method, the step D further comprising steps of:
d1: detecting a geographical location of a user and comparing the geographical location with a preset geographical range, where if the geographical location is inside the preset geographic range, one of the generated plurality of sub-combinations are transmitted to a camera interface through one path according to the distributing rule and the sub-combination is displayed as a virtual object on a screen for the user to touch the virtual object to display the sub-combination on the screen; if the geographical location is not inside the preset geographic range, at least one predetermined invalid-sub-combination is transmitted to the camera interface through a path according to the distributing rule; whereby when the user touches the virtual object, the at least one invalid-sub-combination is displayed on the screen;
wherein the step of E further comprises:
e1: combining the sub-combinations or the least one invalid-sub-combination received by the camera interfaces with other sub-combinations according to the combining rule, so as to form a multi-factor authentication code or an invalid number code.

The present invention also provides a system for generating a multi-factor authentication code, comprising a processor being programmed to function as:
a random number generator for generating a plurality of random numbers; an arranging unit for arranging the plurality of random numbers into a combination in a time-series or a random way;
a dividing unit for dividing the combination into a plurality of sub-combinations;
a transmitting unit for transmitting each of the plurality of sub-combinations to one of corresponding plurality of interfaces via one path according to a distributing rule; and
a combining unit for combining the plurality of sub-combinations received by the plurality of interfaces to form the multi-factor authentication code according to a combining rule.

In implementation, the distributing rule is to correspond each of the plurality of sub-combinations to one of plurality of interfaces.

In implementation, the processor is further programmed to function as:
a location unit for detecting a geographical location of a user; and a determining unit for comparing the geographical location with a preset geographical range where if the geographical location is inside the preset geographic range, and then each of the generated plurality of sub-combinations is transmitted to one of corresponding plurality of interfaces through one path by the transmitting unit according to the distributing rule, and the plurality of sub-combinations received by the plurality of interfaces are combined by the combining unit to form the multi-factor authentication code according to a combining rule; if the geographical location is not inside the preset geographic range, an predetermined invalid-sub-combination is transmitted to one of the corresponding plurality of interfaces through a path by the transmitting unit according to the distributing rule; and then the invalid-sub-combination received by the one of the plurality of interfaces is combined with other sub-combinations in the plurality of interfaces by the combining unit according to the combining rule so as to form an invalid number code.

In implementation, the processor is further programmed to function as:
a bit-number determining unit for determining bit number and number of each random numbers generated by the random number generator; and a verifying unit for verifying the random numbers, wherein the plurality of interfaces comprise at least one visual interface, an auditory interface and a login interface.

In implementation, the processor is further programmed to function as:
a location unit for detecting a geographical location of a user; and a determining unit for comparing the geographical location with a preset geographical range, and if the geographical location is inside the preset geographic range, and then each of the generated plurality of sub-combinations is transmitted to a camera interface through one path by the transmitting unit according to the distributing rule, and the sub-combinations is displayed as a virtual object on a screen; if the geographical location is not inside the preset geographic range, an predetermined invalid-sub-combination is transmitted to the camera interfaces through a path by the transmitting unit according to the distributing rule, and the sub-combination is displayed as a virtual object on a screen; whereby when the user touches the virtual object, the sub-combination or the invalid-sub-combination is displayed on the screen.

Embodiments of the present invention will be described by way of exemplary embodiments, but not limitations, illustrated in the accompanying drawings in which like references denote similar elements.

DETAILED DESCRIPTIONS OF PREFERRED EMBODIMENTS

Figure 1:
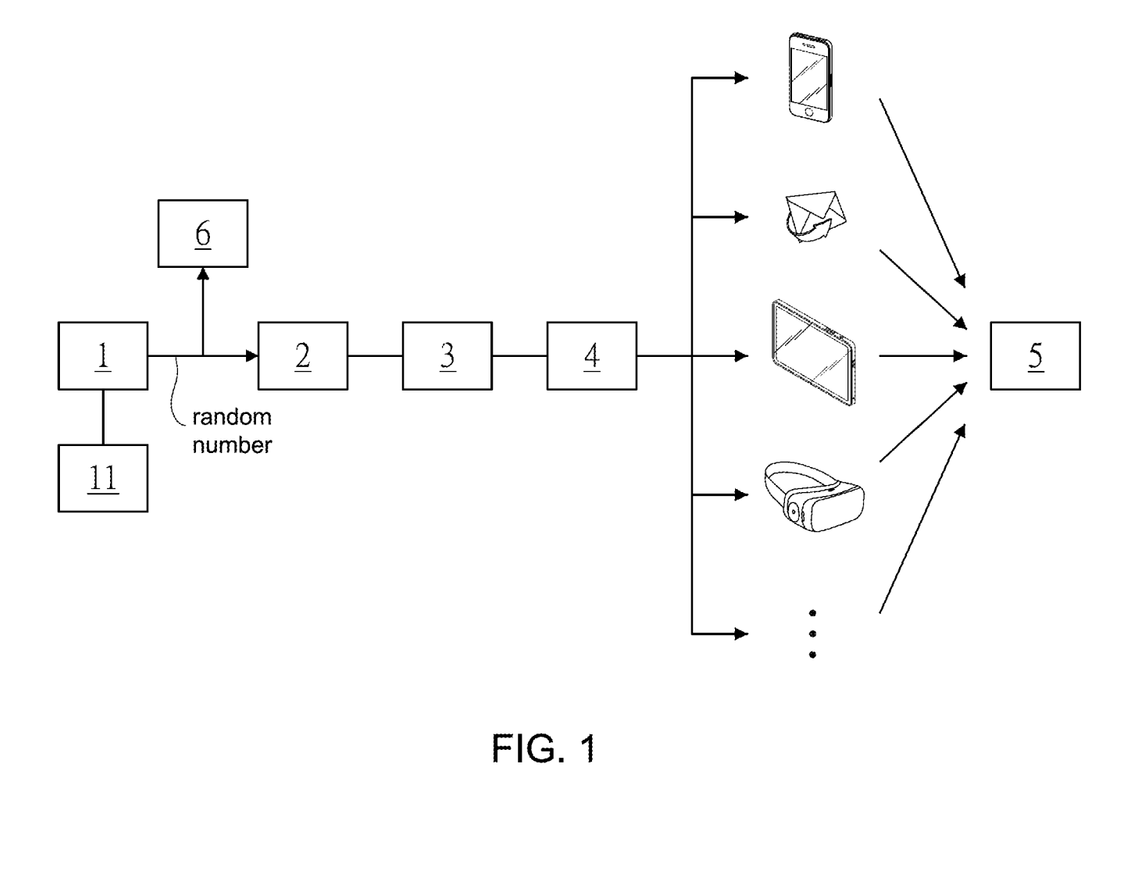
FIG. 1 is a schematic view of an embodiment of the system for generating a multi-factor authentication code.

The present invention discloses a system for generating a multi-factor authentication code. Referring to FIG. 1, the system comprises a random number generator 1, an arranging unit 2, a dividing unit 3, a transmitting unit 4, a combining unit 5, a verifying unit 6 and a bit-number determining unit 11, wherein the random number generator 1 is connected with the arranging unit 2; the arranging unit 2 is connected with the dividing unit 3; the dividing unit 3 is connected with the transmitting unit 4; the transmitting unit 4 is connected with a plurality of devices; the plurality of devices is connected with the combining unit 5; the bit-number determining unit 11 is connected with the random number generator 1. The random number generator 1, the arranging unit 2, the dividing unit 3, the transmitting unit 4, the combining unit 5, the verifying unit 6 and the bit number determining unit 11 could be personal devices such as computers, tablet computers and smart phones servers, or large devices such as servers, or reduced to a virtual machines or integrated circuits, for calculating a lot of information when a lot of users are online.

Moreover, the random number generator 1 is used for generating a plurality of random numbers that is completely random. The arranging unit 2 is used for arranging the plurality of random numbers into a combination in a time-series or a random way. The dividing unit 3 is used for dividing the combination into a plurality of sub-combinations. The transmitting unit 4 is used for transmitting each of the plurality of sub-combinations to one of corresponding plurality of interfaces respectively via one path according to a distributing rule. The combining unit 5 is used for combining the plurality of sub-combinations received by the plurality of interfaces to form a multi-factor authentication code according to a combining rule. The verifying unit 6 is used for verifying the random numbers regarding the security. The bit-number determining unit 11 is used for determining the number of the random numbers generated by the random number generator 1 and the bit number of each random number.

Figure 2:
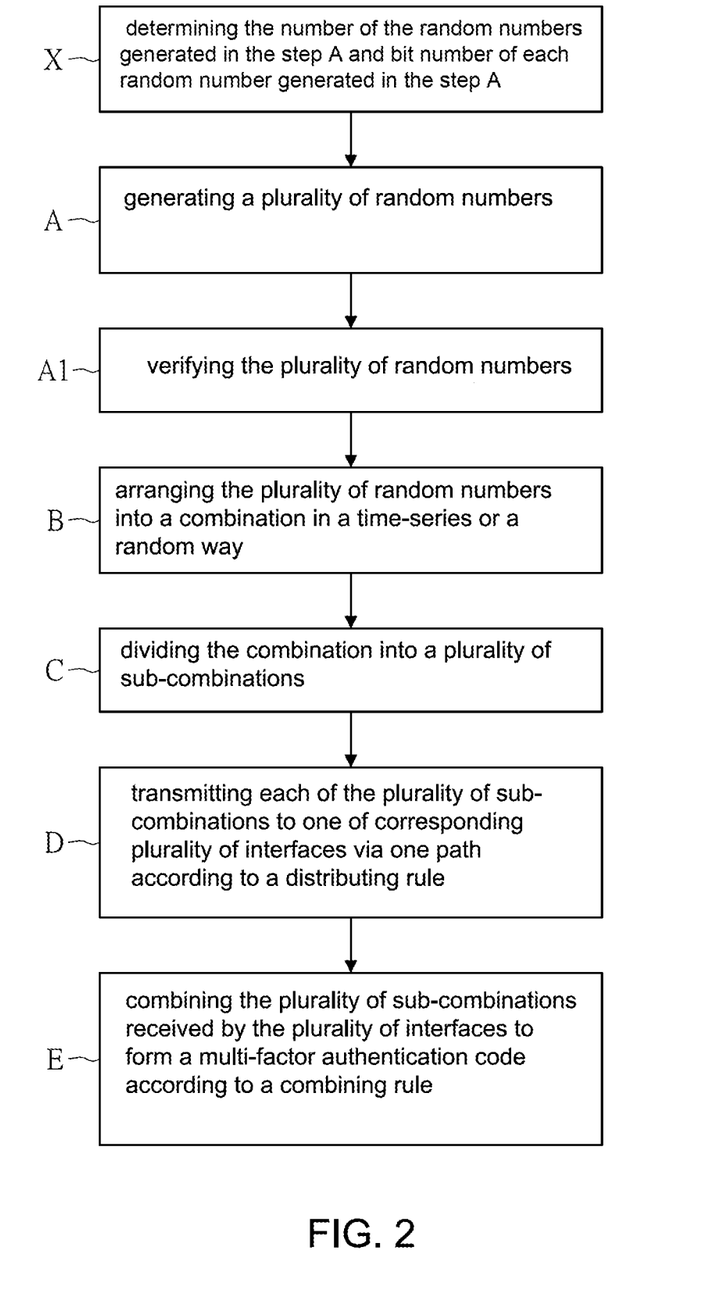
FIG. 2 is a process diagram of an embodiment of the method for generating a multi-factor authentication code.

Referring to FIG. 2, the present invention discloses a method for generating a multi-factor authentication code, comprising steps of X: determining the number of the random numbers generated in the step A and bit number of each random number generated in the step A;

A: generating a plurality of random numbers that is completely random;

B: arranging the plurality of random numbers into a combination in a time-series or a random way;

C: dividing the combination into a plurality of sub-combinations;

D: transmitting each of the plurality of sub-combinations to one of corresponding plurality of interfaces respectively via one path according to a distributing rule;

E: combining the plurality of sub-combinations received by the plurality of interfaces to form the multi-factor authentication code according to a combining rule.

In another embodiment, the step of D further comprises:

D1: detecting a geographical location of a user and comparing the geographical location with a preset geographical range, where if the geographical location is inside the preset geographic range, each of the generated plurality of sub-combinations is transmitted to one of corresponding plurality of interfaces through one path according to the distributing rule;

if the geographical location is outside the preset geographic range, at least one predetermined invalid-sub-combination is transmitted to one of the corresponding plurality of interfaces according to the distributing rule through a path;

In another embodiment, the step D further comprises:

d1: detecting a geographical location of a user and comparing the geographical location with a preset geographical range, where if the geographical location is inside the preset geographic range, one of the generated plurality of sub-combinations is transmitted to a camera interface through one path according to the distributing rule and the sub-combination is displayed as a virtual object on a screen for the user to touch the virtual object to display the sub-combination on the screen; if the geographical location is not inside the preset geographic range, at least one predetermined invalid-sub-combination is transmitted to the camera interface through a path according to the distributing rule; whereby when the user touches the virtual object, the at least one invalid-sub-combination on the screen is displayed;

In another embodiment, the step of E further comprises:

E1: combining the sub-combinations or the at least one invalid-sub-combination received by the plurality of interfaces with other sub-combinations according to the combining rule so as to form the multi-factor authentication code or an invalid number code;

In another embodiment, the step E further comprises:

e1: combining the sub-combinations or the least one invalid-sub-combination received by the camera interfaces with other sub-combinations according to the combining rule, so as to form a multi-factor authentication code or an invalid number code.

The method and system of the present invention will be described hereinafter: at first, in the step of X, the number of the random numbers generated by the random number generator 1 is determined and the bit number of each random number is determined by the bit-number determining unit 11, wherein the bit number or the number of each random number may be the same or different from each other. The bit number of the random number generated by the random number generator 1 can be set to be completely random, that is, the bit number of the generated random number in the specific time interval can be the same or different from each other. Since considering that the efficiency of the resource of the system (hardware) and letting the subsequent related steps be able to perform simply and rapidly, the bit number of the generated random number can be set to be the same. For example, the random number having specific bit number is generated in a specific time interval and the random number having specific bit number is generated in another time interval. For example, the random number having two bits is generated in the first minute; the random number having three bits is generated in the second minute. Regarding the number of the generated random number, if the number of the users is small, it can be set to generate a dozens of random numbers to be used or can also be adjusted in accordance with the practical need. For example, if the number of the users is large, it can be set to generate hundreds or thousands of random number in a specific time interval according to the requirements of the system resource.

Moreover, in the step A, in one embodiment, of generating a plurality of random numbers that is completely random, the random number generator 1 generates plurality of random numbers by an analog signal source, a digital signal source, an internet signal source or a quantum signal source. In one embodiment, the analog signal source, the digital signal source, the internet signal source and the quantum signal source are set to generate at least one random number respectively. The analog signal source, digital signal source and the internet signal source have respectively at least one signal input end, wherein the analog signal source may include analog signals produced from computer hardware such as radiator fan, the noise signal of circuit of the board and power supply; the digital signal source includes digital signals produced from at least one algorithm set, the combination thereof or the combination of plurality of the algorithm set by the administrator; the internet signal source includes internet signals produced from the information in internet or in internal server API (Application Programming Interface) such as online real time quantum random source (binary, hex, unit 8 or unit 16). In quantum physics theory, any measurement will disturb the data (for example, the random numbers generated by the video pixel generating device), but the quantum random source can guarantee that the random number is unique number in same time and the same space. Therefore, the random number of the present invention will be unique. If the random seed is unique, the random number will be non-deterministic random number. If the random seed is not unique, all random numbers can be easy reverse and obtained by sequencing or calculating by quantum computation developed in the future technologies. On the other hand, the advantage of using these four sources (the analog signal source, the digital signal source, the internet signal source and the quantum signal source) as a random seed source ensures that signals can be processed continually without interruption when one or more than one of the analog signal source, digital signal source, the internet signal source or the quantum signal source is broken.

When the random number generator 1 receives the signals from one of the above four signal sources, where the analog signals are converted into digital signals by an analog/digital converter first, and then they will be converted in to random numbers by a random number function; the digital signal source and the internet signal source are converted into random numbers respectively by different random number functions, wherein the random number functions described above comply with the rule of the American National Standards Institute (ANSI). The random numbers from the analog signal source, the digital signal source and the internet signal source are combined to form a plurality of random numbers by the random number generator 1. When the Internet or LAN network is interrupted, the above signal sources will be adjusted into three analog signals because the transmission of internet signal source, digital signal source and the quantum signal source via Internet or LAN network will not work. After the three analog signals are converted into three digital signals, the three digital signals are converted into random numbers respectively by different random number functions, so as to maintain the random number generation step.

In one embodiment, the signal source of the random number generator 1 can be selected from a group consisted of the analog source, the digital signal source, the internet signal source and the quantum signal source. For example, except for a group consisted of one analog source, one digital signal source, one internet signal source and one quantum signal source, the group can be consisted of two analog signal sources and one digital signal source; two analog signal sources and one internet signal source; two digital signal sources and one analog signal source; two digital signal sources and one internet signal source; two internet signal sources and one analog signal source; two internet signal sources and one digital signal source; three analog signal sources, three digital signal sources, three internet signal sources or three quantum signal source (there are many of combination not described here). Therefore, the complexity of the random number combination is increased.

In one embodiment, there is one or more than one of the signal input end respectively for analog source, the digital signal source, the internet signal source and the quantum signal source. Such combination is further combined with the combinations described above, so that it has extremely high complexity, so as to enhance significantly the complexity of the random number generation process for the random number generator 1. In one embodiment, the analog signal source, digital signal source, the internet signal source and the quantum signal source can be a virtual machine or Integrated circuit for performing the random number generation process, wherein the input signal end of the digital signal source can be from another virtual machine or integrated circuit, which executes a plurality of algorithms.

In the step of A1, the random number is verified. The present invention uses a statistically specific algorithm (e.g., test of goodness of fit) to verify whether such generated random numbers are statistically significant (if the generated random numbers are statistically significant, the generated random numbers are completely random); the generated random number generated is analyzed by comparing a quantum signal source such as a photon generated by a camera pixel with the random number generated in the above step A, so as to confirm whether the random number is generated under specific rules (i.e., non-random). Or, the statistical method is used to analyze whether or not the generated random number in real time is correlated with the former one or the latter one, thereby greatly enhancing the confidentiality, authenticity, controllability, availability, integrity and non-repudiation of the random seeds of the present invention.

Moreover, in the step B, the plurality of random numbers are arranged into a combination in a time-series or a random way. Since the random number generated in the step A is verified in Step A1, the generated plurality of random numbers may be arranged into a combination simply in a time-series. Or, in order to ensure that the arranging process in the step B is also performed in a completely random way, the random number can be numbered in accordance with chronological order, such as: 24 (1st), 47 (2nd), 09 (3rd) . . . 65(17th), 34(18th), 23(19th) and 56(20th). Afterward, another random number generator produces plurality of random numbers such as 100, 19, 30, 17, 56, 71, 61, 1, 97 and 2 . . . etc, and then those random numbers are sorted lower than the 20 set by the administrator. For example, if twenty of random numbers are generated, the random number that their number are between 1 to 20 such as 19, 17 1, 2 . . . etc are sorted. Afterward, these sorted random numbers as order for the generated random number in the step A are used. For example, in this paragraph, finally we will obtain the random number: 23, 65, 24 and 47. Thus, in the arranging process of the step B, at least two set of combinations that are completely random are used; thereby the generated random numbers from the step B are more complex.

Moreover, in the step C, the combination is divided into a plurality of sub-combinations. This step is to assign the arranged random numbers to a plurality of sub-combinations according to the need of the user or in a random way or in a way through AI (Artificial Intelligence). For example, if the generated random numbers have ten bits (ex: 9823740257), this generated random number may be divided into five groups, that is, 98, 23, 74, 02, 57, or may be randomly divided into four groups, that is, 9823, 740, 2, 57.

In the step D, each of the plurality of sub-combinations are transmitted to one of corresponding plurality of interfaces respectively via one path such as Internet, local area network or mobile network according to a distributing rule, wherein the distributing rule is to have each of the plurality of sub-combinations corresponding to one of plurality of interfaces and these corresponding relationships are set by at least one of the user or by administrator. The plurality of interfaces are selected from a group consisted of a visual interface, a auditory interface and a login interface provided in any other electronic device such as smart phones, tablet PC, smart watches, personal computers and virtual reality systems. The distributing rule is preset by a single user or a plurality of users. The number having ten bits are used as the example (9823740257), if the arranged random number is divided into four groups (9823, 740, 2, 57) in the step C, the single user can sequentially distribute those four groups (9823, 740, 2, and 57) to the SMS interface of a smart phone, e-mail interface, auditory interface of a tablet, and the visual interface of a smart watch respectively according to the distributing rule. In this example, the number "2" assigned to the auditory interface of the tablet is converted into an audio signal so that user can listen to the audio signal and understand its content.

In the step E, after the user reads (by watching or listening) the plurality of sub-combinations in the plurality of interfaces, the plurality of sub-combinations received by the plurality of interfaces is combined to form the multi-factor authentication code according to a combining rule (the rule mentioned above: first, the SMS interface of the smart phone; second, the e-mail interface; third, the auditory interface of the tablet; and fourth, the visual interface of the smart watch), so as to finish the process for producing the multi-factor authentication code. In other words, the user needs to read the sub-combinations in SMS interface of the smart phone, the e-mail interface, the auditory interface of the tablet computer and the visual interface of the smart watch respectively and then the sub-combinations are combined successfully for user to obtain the correct multi-factor authentication code. If the account of one of the interface is once cracked or invaded, hackers would only get part (¼) of the multi-factor authentication code, in the absence of other parts of the multi-factor authentication code, hackers still cannot effectively obtain entire multi-factor authentication code. Moreover, the scammer is extremely rampant among Facebook, Line, WeChat and other instant messaging interface (or APP), the system and method of the present invention can divide the multi-factor authentication code into the plurality of sub-combinations, and consequently users have further indirect defense in the process of combining the sub-combination, so the entire authentication code would not be accidentally leak, which will lead to the loss of the entire personal accounts and their contents. On the other hand, for users using credit card, the method and system of the present invention can also prevent the information of the credit card from being swiped on the internet, which would lead to identity theft. Generally speaking, when processing a credit card charge, the server of the credit card company will transmit an authentication code to the mobile phone. Because the scammer cannot get all of the sub-combinations, the system and method of the present invention are effective in preventing the credit card from being swiped. In one embodiment, the plurality of the interfaces can provide different levels for different users (ex: junior officer). When higher-level user (ex: senior manager) needs to log in a particular interface such as interfaces of financial statements or trade secrets . . . etc in a server or system with a high-level security, in addition to their accounts, password and biometrics elements (such as fingerprints, iris, voiceprints, walking posture), higher-level user also need to obtain the correct combining rule of the present invention through an encrypted communication so as to combine his sub-combination from his specific interface with the sub-combinations from other general-level users and then log in the interface with high-level security successfully. Thus, in this way, the security of the present login interface will be greatly improved, and the security of the visual interface, the auditory interfaces and the login interface in the present devices will be effectively improved.

In one embodiment, the step D further comprises steps of D 1: a geographical location of a user is detected by a location unit and the geographical location is compared with a preset geographical range by a determine unit, if the geographical location is inside the preset geographic range, a message is sent to the transmitting unit 4 and the combining unit 5; and then each of the generated plurality of sub-combinations are transmitted to one of corresponding plurality of interfaces through one path by the transmitting unit 4 according to the distributing rule and the plurality of sub-combinations received by the plurality of interfaces are combined to form the multi-factor authentication code by the combining unit according to a combining rule. If the geographical location is not inside the preset geographic range, at least one predetermined invalid-sub-combination is transmitted to one of the corresponding plurality of interfaces by the transmitting unit 4 according to the distributing rule through a path. Moreover, in another embodiment, the step E further comprises step of E1: the invalid-sub-combination received by the one of the plurality of interfaces is combined with other sub-combinations in the plurality of interfaces by the combining unit 5 according to the combining rule so as to form an invalid number code. The primary purpose of the step D1 and E1 is to back track the malicious and illegal login behavior. In one embodiment, the present invention can provide a fake login interface. In other words, the fake login interface would lead the illegal user to login a fake system, and the fake system contains false data to allow the illegal user to steal, and the fake system can track back location range, IP and other relevant information of the illegal user at the same time. Moreover, in one embodiment, the step D 1 of detecting a geographical location of a user can be performed in or between any steps that are before the step D. For example, between the steps X and A, A and A1, A1 and B, B and C or C and D, even before the step X (the first step).

Figure 3A:
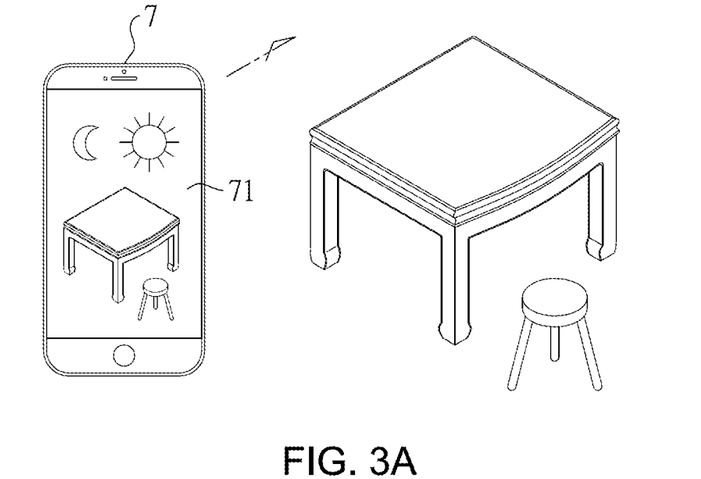
FIG. 3A and FIG. 3B are schematic views of an embodiment of the method and system for generating a multi-factor authentication code.
Figure 3B:
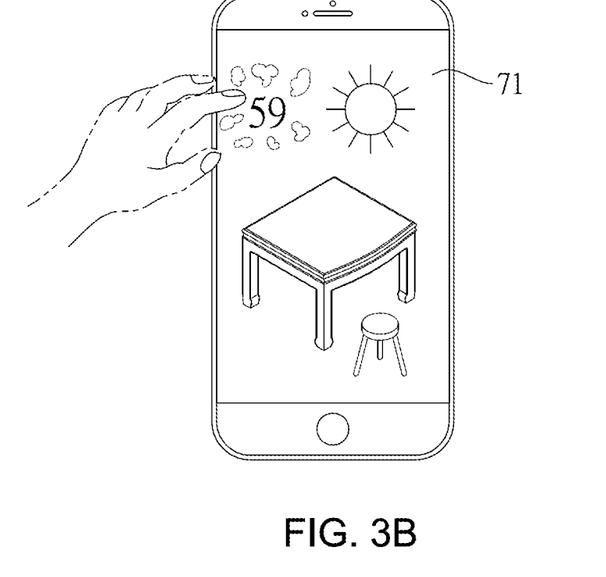

In one embodiment, the step D further comprises a step d1: detecting a geographical location of a user with the location unit and comparing the geographical location with a preset geographical range by the determine unit. Please refer to FIG. 3A, a camera interface 7 displays a virtual object (in this embodiment, that is, a sun pattern and a moon pattern) in a instant image on a screen 71. the camera interface 7 is a smart phone. According to the result of the comparison, if the geographical location is inside the preset geographic range, one of the generated plurality of sub-combinations is transmitted to the camera interface 7 through one path according to the distributing rule and the correct sub-combination is displayed as a virtual object on the screen 71 for the user to touch the virtual object to display the correct sub-combination on the screen (referring to FIG. 3B). If the geographical location not inside the preset geographic range, at least one predetermined invalid-sub-combination is transmitted to a camera interface 7 through a path according to the distributing rule; whereby when the user touches the virtual object, the invalid-sub-combination is displayed on the screen 71. And the step E further comprising the step e1: combining the sub-combinations or the least one of the invalid-sub-combinations received by the camera interfaces 7 with other sub-combinations according to the combining rule, so as to form a multi-factor authentication code or an invalid number code. The embodiments can also be applied to the field of Internet of Things, specifically to the field of electronic immobilizers of the vehicle, and it can be applied to vehicle start code (password) in the field of Keyless Entry System. First, in this application, the preset geographic range could be included at least one of the user's parking places, such as home, offices or a school of user's kids . . . etc. The camera interface mentioned above could be a smart phone, a dash cam (dashboard camera) and so on. Of course, the vehicle only can be started by using the correct combination, and the vehicle cannot be started by using the invalid-combination. In practice, a processor may be provided on the vehicle to carry out the steps of combining the plurality of sub-combinations (correct or invalid ones) from different interfaces or sources. In this way, different codes corresponding to the combinations of the present invention for starting variety of vehicles are provided in different locations, which increases the complexity of the vehicle codes for starting a vehicle, and the vehicle codes for starting the same are different, so as to avoid the leakage of the vehicle codes.

Figure 4A:
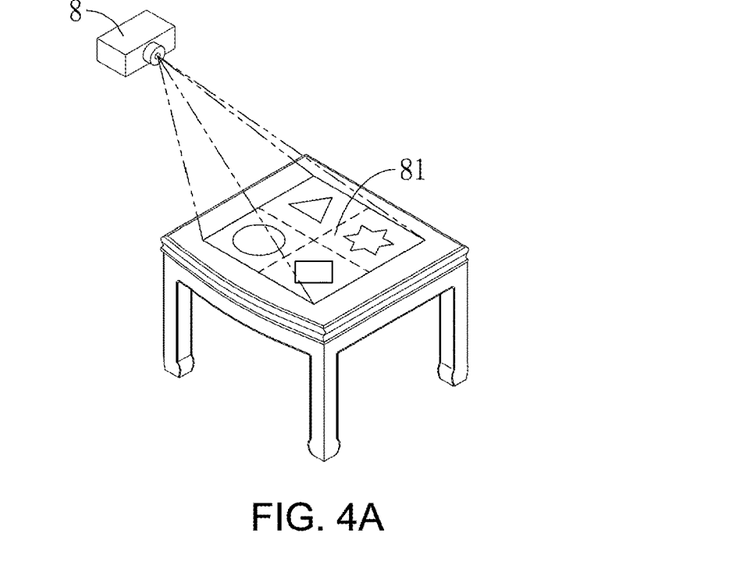
FIG. 4A and FIG. 4B are schematic views of an embodiment of the method and system for generating a multi-factor authentication code.
Figure 4B:
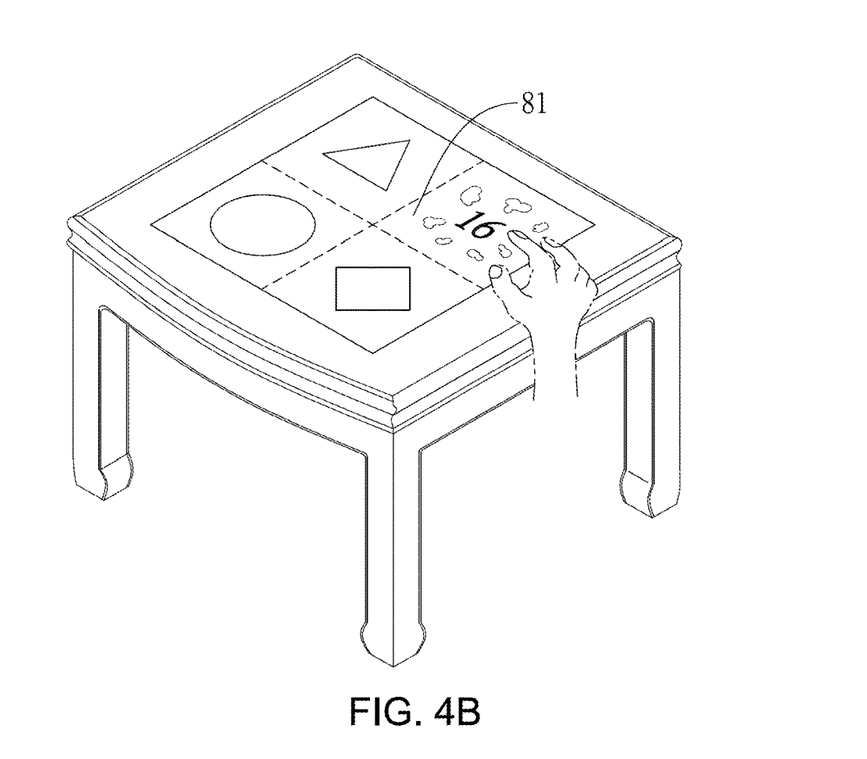

On the other hand, please notice that the invalid sub-combination is still displayed when the user touches the correct virtual object, and if the virtual object not including incorrect sub-combination such as the sun pattern is touched, an incorrect sub-combination is displayed. In this embodiment, the virtual object containing the correct sub-combination is the moon pattern. In other words, because the user cannot obtain all the correct sub-combinations, the user cannot obtain the correct combination and cannot successfully log in. The purpose of the step d1 is to track back the malicious and illegal login behavior. In one embodiment, the present invention can provide a fake login interface and the fake login interface leads the illegal user to login another fake system, and the fake system contains false data to allow the illegal login action to steal, and at the same time the fake system can track back the location range, IP and other relevant information of the illegal login action. In one embodiment, referring to FIG. 4A, the camera interface is a projection device 8 which displays a virtual object (the patterns of triangle, star, circle and diamond in this embodiment) in the projected screen 81. In the same way, according to the result of the comparison performed by the determining unit, the correct sub-combination or the invalid sub-combination is displayed as a virtual object on the projected screen 81. When the user touches the correct virtual object, the correct sub-combination is displayed on the projected screen 81. Referring to FIG. 4B, the correct virtual object in this embodiment is a star pattern. Moreover, in one embodiment, the step d1 of detecting a geographical location of a user can be performed in or between any steps that are before the step D. For example, between the steps X and A, A and A1, A1 and B, B and C or C and D, even before the step X (the first step).

Figure 5A:
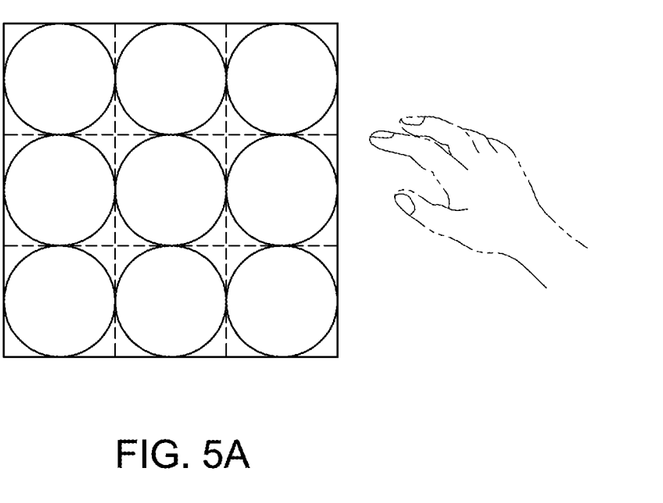
FIG. 5A and FIG. 5B are schematic views of an embodiment of the method and system for generating a multi-factor authentication code.
Figure 5B:
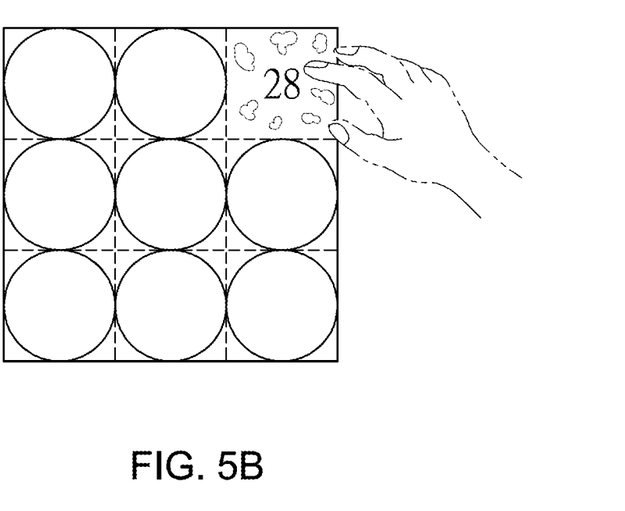

On the other hand, the virtual reality system of the present invention comprises a virtual reality system comprising a virtual reality vision device such as a glass with plastic lens, a glass with a liquid crystal lens, a glass with a liquid crystal wireless eyewear or a helmet display, and a virtual reality operating device. The virtual reality vision device projects at least one of the plurality of sub-combinations as a virtual object located at a specific position in a virtual screen. When the user touches the virtual object located at a specific position in a virtual screen with the virtual reality operating device such as a virtual reality glove or a 3D mouse, the plurality of sub-combinations included in the virtual object are displayed to the user by the virtual reality visual device. The virtual screen is a 3×3 grid which can be easily memorized by the user. If the virtual screen needs more complicated order, it can be a square gird such as 4×4, 5×5, 6×6; or rectangular grid such as 2×3, 4×5, etc; or triangular, trapezoidal, circle or a combinations thereof. For example, referring to FIG. 5A, the user can set the correct upper right corner as a position that shows the correct sub-combination (or authentication code), and the user wears the virtual reality operating device such as the virtual reality glove or the 3D mouse and then touches the virtual object with the virtual reality operating device. Only when the user touches the correct position, the combination shown in the visual object is correct (as shown in FIG. 5B), while the combinations of virtual objects in the other eight positions are randomly generated by the random numbers generator 1. Although the eight combinations of virtual objects in the other eight positions would be opened after the user touch them, but the numbers inside are all incorrect sub-combinations. Thus, since only the administrator or the account owner knows the correct position, even if the virtual reality visual device is stolen or hacked, it is still necessary for the thief or hacker to guess which one of the grids is correct. Moreover, even if the thief or hacker guesses this correct position, the thief must crack the other interfaces and obtain the specific combining rule. In another embodiment, the correct position may be not limited to only one, and it may be more than one, thereby increasing the complexity of the virtual reality operating device of the present invention.

Figure 6A:
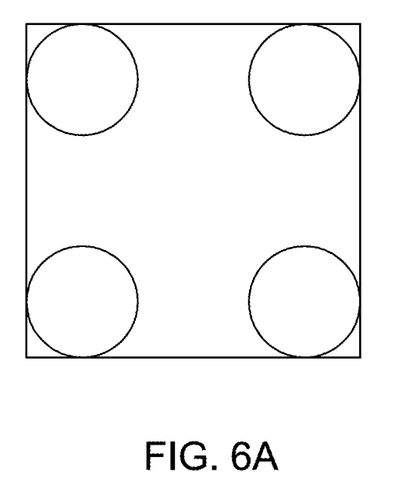
FIG. 6A and FIG. 6B are schematic views of an embodiment of the method and system for generating a multi-factor authentication code.
Figure 6B:
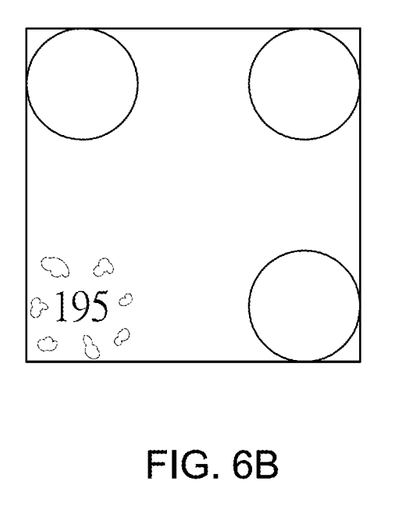

Referring to FIG. 6A, in another embodiment, the specific position mentioned above may be provided in one or at least one corner of a screen having a particular shape (the particular shape is usually a square screen) for the convenience of the user to remember the specific position such as at least one corner of any shape, thereby allowing the user to easily remember the correct position having the correct sub-combinations (as shown in FIG. 6B).

Accordingly, the present invention has the following advantages:

1. In addition to the login process in the way of account, password and biometric identification, the method and system of the present invention enable the login process of the governmental, banking, national defense, enterprise, organizational and medical institutions to have more advanced security during the login process via the visual interface, the auditory interfaces or the login interface provided in a variety of devices by arranging the plurality of random numbers into the plurality of sub-combinations with a specific order (distributing rule or combining rule).

2. By combining the multi-factor authentication code with the virtual reality device, the storage mode of the random numbers becomes more complex, thereby increasing the fun and entertainment of this process.

3. By arranging the plurality of random numbers into a combination in a time-series or a random way and transmitting each of the plurality of sub-combinations to one of corresponding plurality of interfaces via one path according to a distributing rule, even one of the interface or one of the devices are hacked or invaded by someone, since the distributing rule or the combining rule cannot be found in a short time, the present invention provide an additional defense.

4. The random numbers of the present invention are generated by at least one virtual machine or integrated circuit that executes different random number generation programs (or algorithms) in order to avoid using the same or a few programs (or algorithms) and to increase significantly the irregularity of the random number, so as to enhance the complexity of the generated random numbers.

5. The geographical range is used as another condition for performing multi-factor authentication, so that the login process cannot be performed within a non-preset geographical range thereby adding another security defense of the present invention.

6. By combining the augmented reality with the multi-factor authentication, the security of the multi-factor authentication is greatly enhanced, while it also increases interest during the process of the authentication, and a backtracking step is added to make it more difficult for hacker or thief to login the various interfaces of the present invention.

To sum up, the method and a system for generating a multi-factor authentication code provided by the present invention can indeed meet its anticipated object, and it can be applied to the variety of electronic device easily.

What is claimed is:

1. A method performed by a processor for generating a multi-factor authentication code, comprising steps of:
   A: generating a plurality of random numbers;
   B: arranging the plurality of random numbers into a combination in a time-series or a random way;
   C: dividing the combination into a plurality of sub-combinations;
   D: transmitting each of the plurality of sub-combinations to one of corresponding plurality of interfaces via one path according to a distributing rule; and
   E: combining the plurality of sub-combinations received by the plurality of interfaces to form a multi-factor authentication code according to a combining rule;
   the step D further comprising steps of:
      d1: detecting a geographical location of a user and comparing the geographical location with a preset geographical range, where if the geographical location is inside the preset geographic range, one of the generated plurality of sub-combinations is transmitted to a camera interface through one path according to the distributing rule and the sub-combination is displayed as a virtual object on a screen for the user to touch the virtual object to display the sub-combination on the screen;
      if the geographical location is not inside the preset geographic range, at least one predetermined invalid-sub-combination is transmitted to the camera interface through a path according to the distributing rule;
      whereby when the user touches the virtual object, the at least one invalid-sub-combination is displayed on the screen;
   wherein the step of E further comprises:
      e1: combining the sub-combinations or the least one invalid-sub-combination received by the camera interface with other sub-combinations according to the combining rule, so as to form a multi-factor authentication code or an invalid number code.

2. The method according to claim 1, wherein the distributing rule is corresponding each of the plurality of sub-combinations to one of plurality of interfaces.

3. The method according to claim 1, wherein the step D further comprises following steps: D1: detecting a geographical location of a user and comparing the geographical location with a preset geographical range, where if the geographical location is inside the preset geographic range, each of the generated plurality of sub-combinations is transmitted to one of corresponding plurality of interfaces through one path according to the distributing rule; if the geographical location is outside the preset geographic range, at least one predetermined invalid-sub-combination is transmitted to one of the corresponding plurality of interfaces according to the distributing rule through a path; wherein the step of E further comprises: E1: combining the sub-combinations or the at least one invalid-sub-combination received by the plurality of interfaces with other sub-combinations according to the combining rule so as to form the multi-factor authentication code or an invalid number code.

4. The method according to claim 1, wherein the interface comprises at least one of a visual interface, an auditory interface and a login interface.

5. The method according to claim 1, further comprises a step X before the step A: determining the number of the random numbers generated in the step A and bit number of each random number generated in the step A, wherein each of the random numbers has the same or different bit number.

6. The method according to claim 1, further comprising a step A1 between the step A and the step B: verifying the plurality of random numbers.

7. A system for generating a multi-factor authentication code, comprising a processor being programmed to function as:
   a random number generator for generating a plurality of random numbers;
   an arranging unit for arranging the plurality of random numbers into a combination in a time-series or a random way;
   a dividing unit for dividing the combination into a plurality of sub-combinations;
   a transmitting unit for transmitting each of the plurality of sub-combinations to one of corresponding plurality of interfaces via one path according to a distributing rule; and
   a combining unit for combining the plurality of sub-combinations received by the plurality of interfaces to form the multi-factor authentication code according to a combining rule;

wherein the processor is further programmed to function as:
- a location unit for detecting a geographical location of a user; and
- a determining unit for comparing the geographical location with a preset geographical range where if the geographical location is inside the preset geographic range, and then each of the generated plurality of sub-combinations is transmitted to one of corresponding plurality of interfaces through one path by the transmitting unit according to the distributing rule, and the plurality of sub-combinations received by the plurality of interfaces are combined by the combining unit to form the multi-factor authentication code according to a combining rule;
- if the geographical location is not inside the preset geographic range, an predetermined invalid-sub-combination is transmitted to one of the corresponding plurality of interfaces through a path by the transmitting unit according to the distributing rule; and
- then the invalid-sub-combination received by the one of the plurality of interfaces is combined with other sub-combinations in the plurality of interfaces by the combining unit according to the combining rule so as to form an invalid number code.

8. The system according to claim 7, wherein the distributing rule is to correspond each of the plurality of sub-combinations to one of plurality of interfaces.

9. The system according to claim 7, wherein the processor is further programmed to function as: a bit-number determining unit for determining random number and their bit generated by the random number generator; and a verifying unit for verifying the random numbers, wherein the plurality of interfaces comprise at least one visual interface, an auditory interface and a login interface.

10. The system according to claim 7, wherein the processor is further programmed to function as: a location unit for detecting a geographical location of a user; and a determining unit for comparing the geographical location with a preset geographical range, and if the geographical location is inside the preset geographic range, and then each of the generated plurality of sub-combinations is transmitted to a camera interface through one path by the transmitting unit according to the distributing rule and the sub-combinations is displayed as a virtual object on a screen; if the geographical location is not inside the preset geographic range, an predetermined invalid-sub-combination is transmitted to the camera interfaces through a path by the transmitting unit according to the distributing rule, and the sub-combination is displayed as a virtual object on a screen; whereby when the user touches the virtual object, the sub-combination or the invalid-sub-combination is displayed on the screen.

* * * * *